(12) United States Patent
Liang

(10) Patent No.: US 6,969,462 B2
(45) Date of Patent: Nov. 29, 2005

(54) PIPE MOUNTING APPARATUS FOR WATER FILTER

(76) Inventor: Po-Chi Liang, 10F, No. 162, Nenchiang St., Sanmin Dist., Kaohsiung (TW)

( * ) Notice: Subject to any disclaimer, the term of this patent is extended or adjusted under 35 U.S.C. 154(b) by 385 days.

(21) Appl. No.: 10/411,922

(22) Filed: Apr. 11, 2003

(65) Prior Publication Data

US 2004/0200763 A1    Oct. 14, 2004

(51) Int. Cl.[7] ............................................. B01D 35/00
(52) U.S. Cl. ...................... 210/232; 210/103; 210/258; 210/249; 210/545; 210/339; 137/545; 137/798
(58) Field of Search ............................ 210/232, 258, 210/249, 103, 339, 335, 323.1, 323.2; 137/545, 137/798

(56) References Cited

U.S. PATENT DOCUMENTS 6,139,741 A * 10/2000 McGibbon ............... 210/323.1

6,524,483 B1 * 2/2003 Monroe ...................... 210/652

* cited by examiner

Primary Examiner—Terry K. Cecil
(74) Attorney, Agent, or Firm—Alan D. Kamrath; Nikolai & Mersereau, P.A.

(57) ABSTRACT

A pipe mounting apparatus for a water filter includes a first half body with a top, a first pipe assembly, a second half body with a top, a second pipe assembly and a mounting bracket. The first pipe assembly is formed on the top of the first half body and has a pump inlet and a pump outlet. The second half body is attached to the first half body. Likewise, the second pipe assembly is formed on the top of the second half body and communicates with the first pipe assembly to form a water filtering loop. The mounting bracket is mounted over the two half bodies to support a booster pump. Consequently, the booster pump will be quickly and easily connected to the pump inlet and the pump outlet with fittings or pipes to pump the water into the water filter.

7 Claims, 9 Drawing Sheets

PIPE MOUNTING APPARATUS FOR WATER FILTER

BACKGROUND OF THE INVENTION

1. Field of the Invention

The present invention relates to a pipe mounting apparatus for a water filter, and more particularly to a pipe mounting apparatus that is suitable for do-it-yourself (DIY) users.

2. Description of Related Art

Water filters are used to remove contaminating substances from water being prepared for drinking. A water filter typically has a booster pump, and differential pressure switches and filters to control the flow of the water and remove the pollutants of the water. For example, a reverse osmosis (R. O.) water filter generally has at least two filters. It is inconvenient for a user to assemble all the parts of the R.O. water filter that include the filters, water tanks, connecting pipes etc. together.

Furthermore, if the home water pressure is lower than 60 psi (pounds per square inch) in supply lines, the water filter will need a booster pump to make the water enter the water filter. However, a conventional water filter does not have any water inlet and outlet being preformed for the booster pump and so a user would experience difficulty trying to install the booster pump to the water filter. The installation of the booster pump always needs a specialist person, such as a plumber to do the job. Otherwise, an error might occur, especially where the pipes are connected improperly such that the water filter will have no function.

To overcome the shortcomings, the present invention provides a pipe mounting apparatus for a water filter to mitigate or obviate the aforementioned problems.

SUMMARY OF THE INVENTION

The main object of the invention is to provide a pipe mounting apparatus for a water filter such that a DIY user can easily and quickly install a booster pump for the water filter.

The pipe mounting apparatus is accomplished with use of a first half board assembly, a second half board assembly and a mounting bracket. The first half board assembly is coupled to the second half board assembly and comprises a first half body and a first pipe assembly. The first half body has a top and a bottom. The first pipe assembly is formed on the top of the first half body and has a pump inlet, a pump outlet and a water inlet for being conveniently connected to a booster pump. Likewise, the second half board assembly has a second half body and a second pipe assembly. The second half body is attached to the first half body and has a top and a bottom. The second pipe assembly is formed on the top of the second half body and has a drain outlet, a water outlet and a tank outlet for being quickly connected to the other components of the water filter, such as pressurized water tanks, faucets or the like. The first pipe assembly communicates with the second pipe assembly to form a water filtering loop. The mounting bracket is mounted over the first and the second half bodies to support a booster pump. Consequently, the booster pump will be quickly and easily connected to the first pipe assembly through the pump inlet and outlet by means of fittings or kits.

Other objects, advantages and novel features of the invention will become more apparent from the following detailed description when taken in conjunction with the accompanying drawings.

DETAILED DESCRIPTION OF PREFERRED EMBODIMENT

Figure 1:
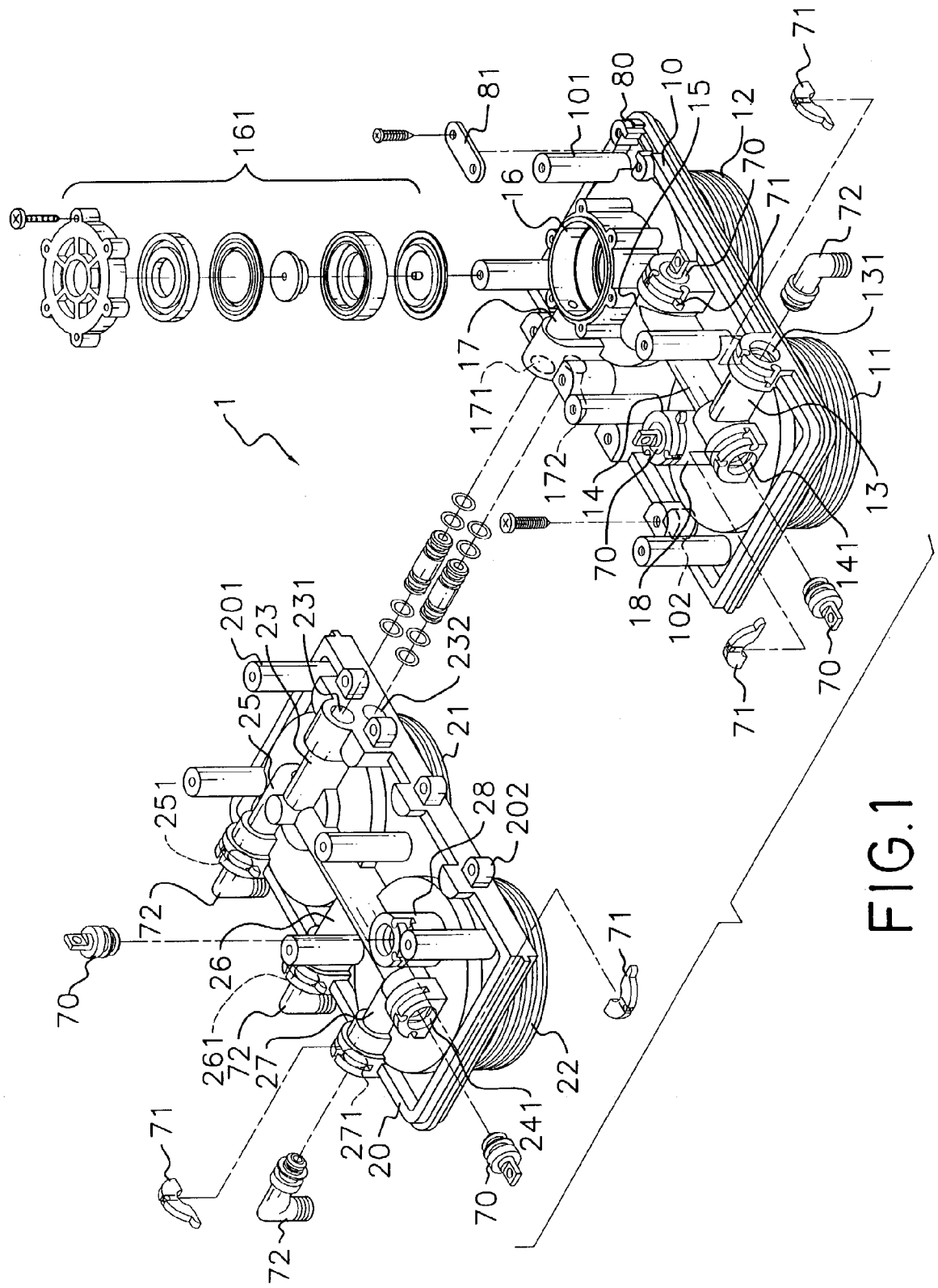
FIG. 1 is an exploded perspective view of a pipe mounting apparatus in accordance with the present invention.
Figure 2:
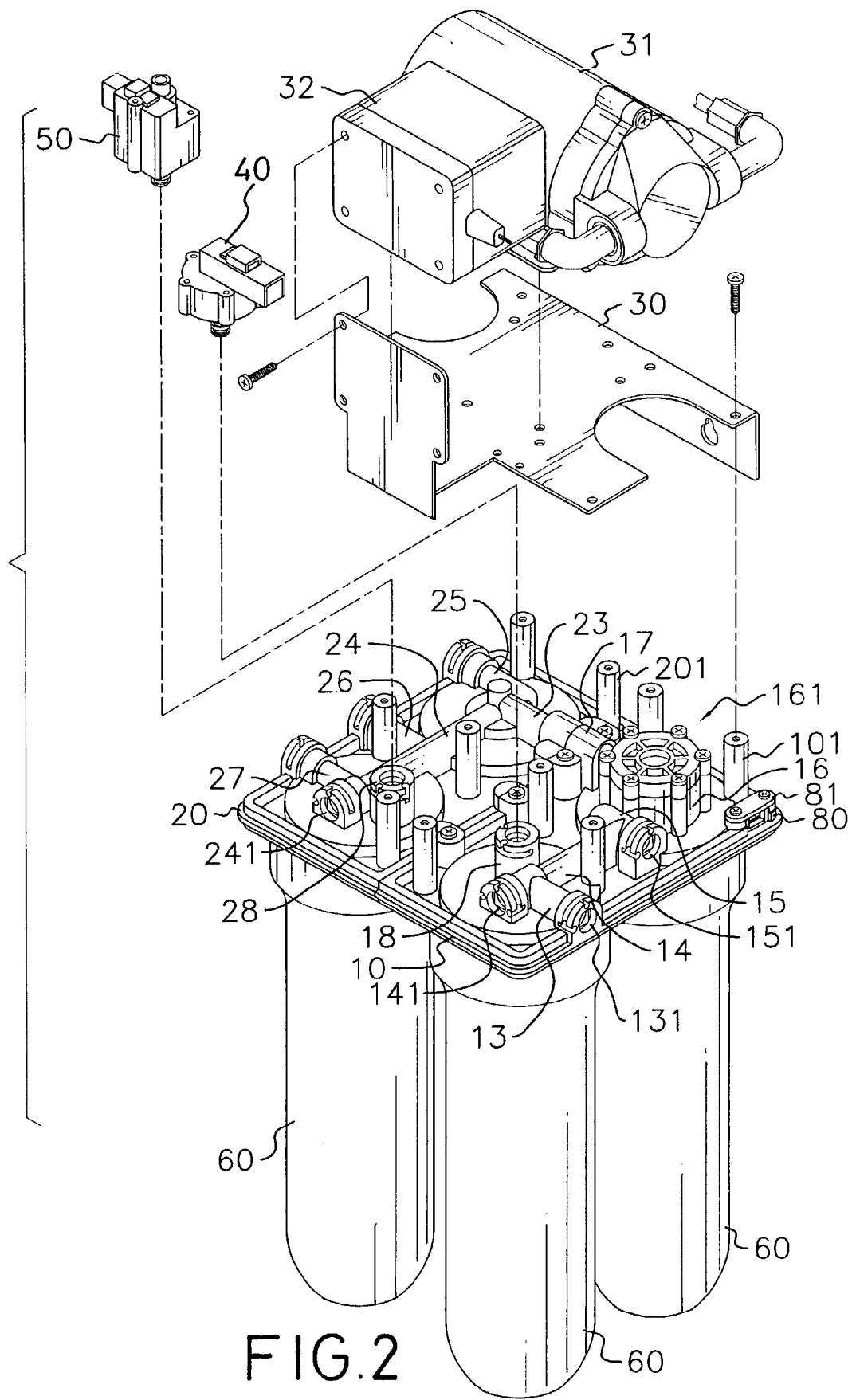
FIG. 2 is an operational, exploded perspective view of a water filter with the pipe mounting apparatus shown in FIG. 1.
Figure 4:
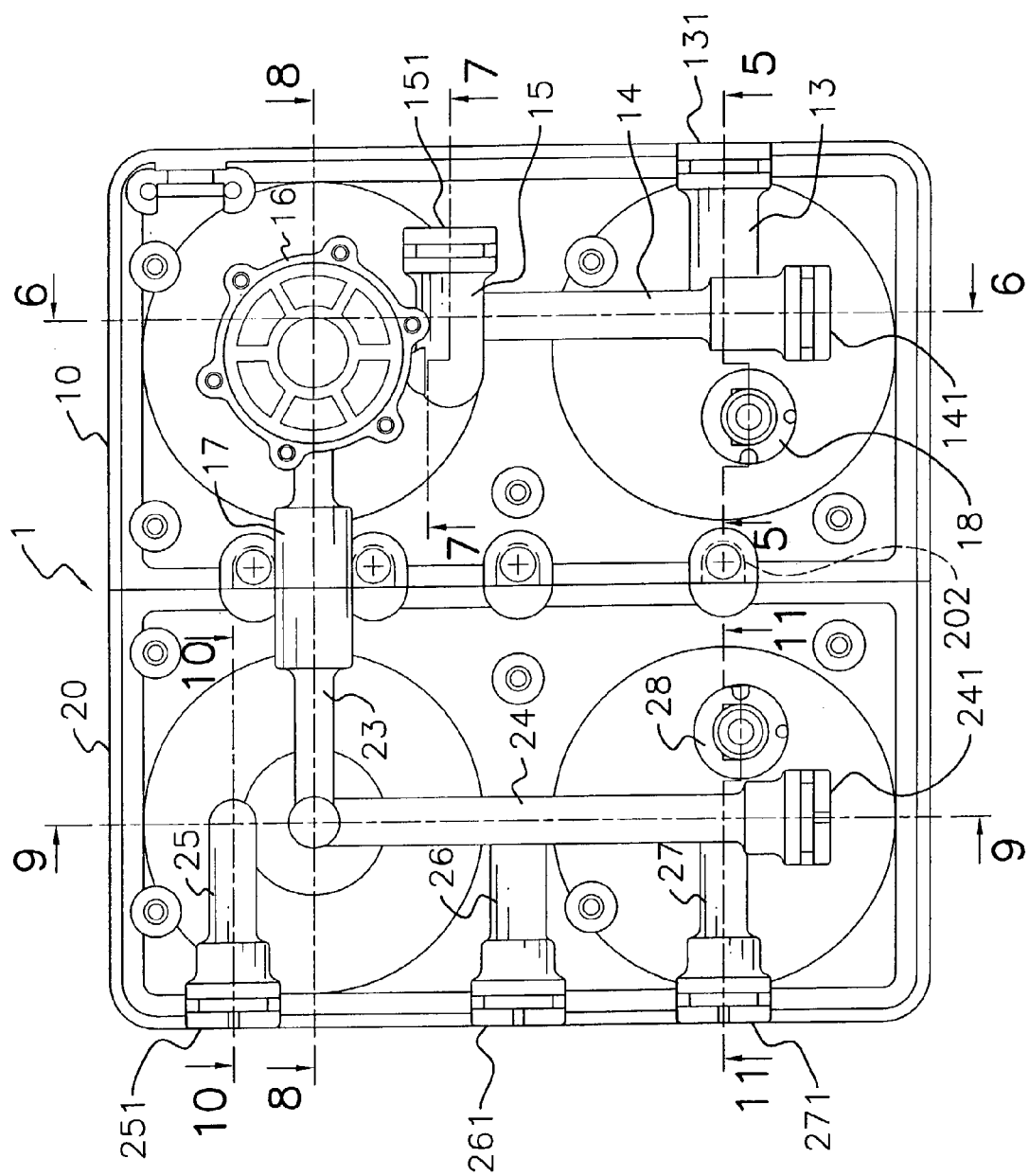
FIG. 4 is a top plan view of the pipe mounting apparatus in FIG. 1.

With reference to FIGS. 1, 2 and 4, a pipe mounting apparatus (1) in accordance with the present invention comprises a first half board assembly (not numbered), a second half board assembly (not numbered), end plugs (70), resilient clamps (71) and connecting elbows (72).

The first half board assembly is coupled to the second half board assembly and comprises a first half body (10), a first filter mounting device (not numbered), a first pipe assembly (not numbered), a differential pressure switch (161) and a first mounting assembly (not numbered). The first half body (10) has a top (not numbered), a bottom (not numbered), a front (not numbered), a rear (not numbered) and two opposite sides (not numbered). The first filter mounting device is formed on the bottom of the first half body (10) and comprises a first housing mounting seat (11) with an inside (not numbered) and an exterior thread (not numbered), a first filter mounting seat (not numbered), a second housing mounting seat (12) with an inside (not numbered) and an exterior thread (not numbered) and a second filter mounting seat (not numbered). The first and the second housing mounting seats (11, 12) are each adapted to mount with a respective one of a group of filter housings (60). The first filter mounting seat is formed inside the first housing mounting seat (11) and has an inside (not numbered) adapted to attach with a filtering core (not numbered). Likewise, the second filter mounting seat is formed inside the second housing mounting seat (12) and has an inside (not numbered) adapted to attach with a filtering core (not numbered).

The first pipe assembly is formed on the top of the first half body (10) and comprises a water inlet pipe (13), a first longitudinal pipe (14), a pump outlet pipe (15), a switch recess (16) and a first connecting pipe (17).

Figure 5:
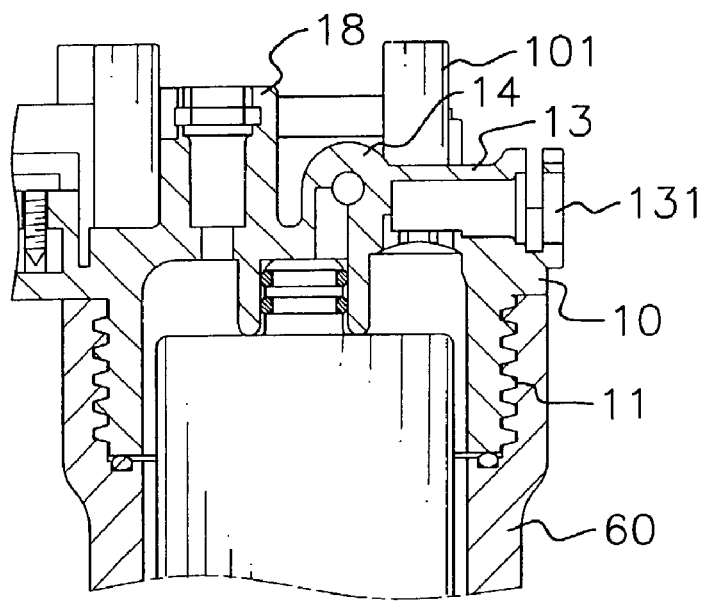
FIG. 5 is a cross sectional plan view of the pipe mounting apparatus along 5—5 line in FIG. 4.
Figure 6:
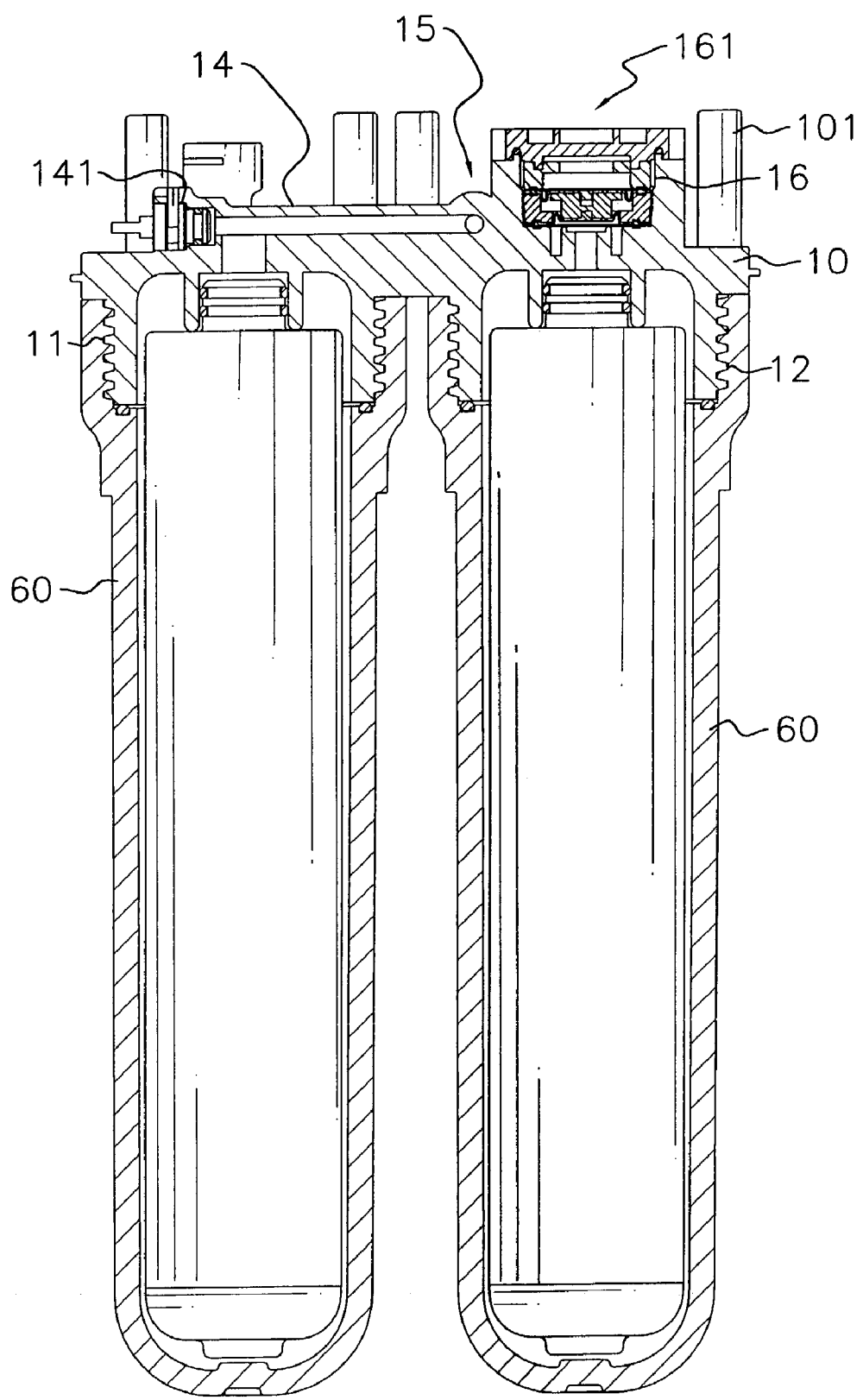
FIG. 6 is a cross sectional plan view of the pipe mounting apparatus along 6—6 line in FIG. 4.

With further reference to FIGS. 5 and 6, the water inlet pipe (13) has a supply water inlet (131) and an inside opening (not numbered) that communicates with the inside of the first housing mounting seat (11). The first longitudinal pipe (14) is formed from the front to the rear on the top of the first half body (10) and has a pump inlet (141) and an inside opening (not numbered). Also, the first longitudinal pipe (14) communicates with the inside of the first filter mounting seat like a tee fitting.

Figure 7:
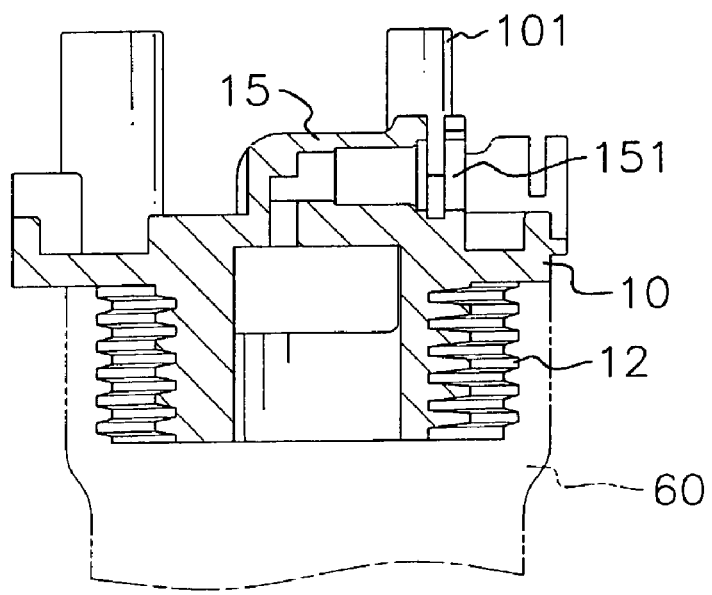
FIG. 7 is a cross sectional plan view of the pipe mounting apparatus along 7—7 line in FIG. 4.

With further reference to FIG. 7, the pump outlet pipe (15) has a pump outlet (151) and an inside opening (not numbered) that communicates with the inside of the second housing mounting seat (12). Also, the pump outlet pipe (15) communicates with the inside opening of the first longitudinal pipe (14).

With reference to FIG. 6, the switch recess (16) is defined through the top of the first half body (10) and communicates with the inside of the second filter mounting seat. The switch recess (16) has a bottom (not numbered). The differential pressure switch (161), which is conventional, is mounted in the switch recess (16).

Figure 8:
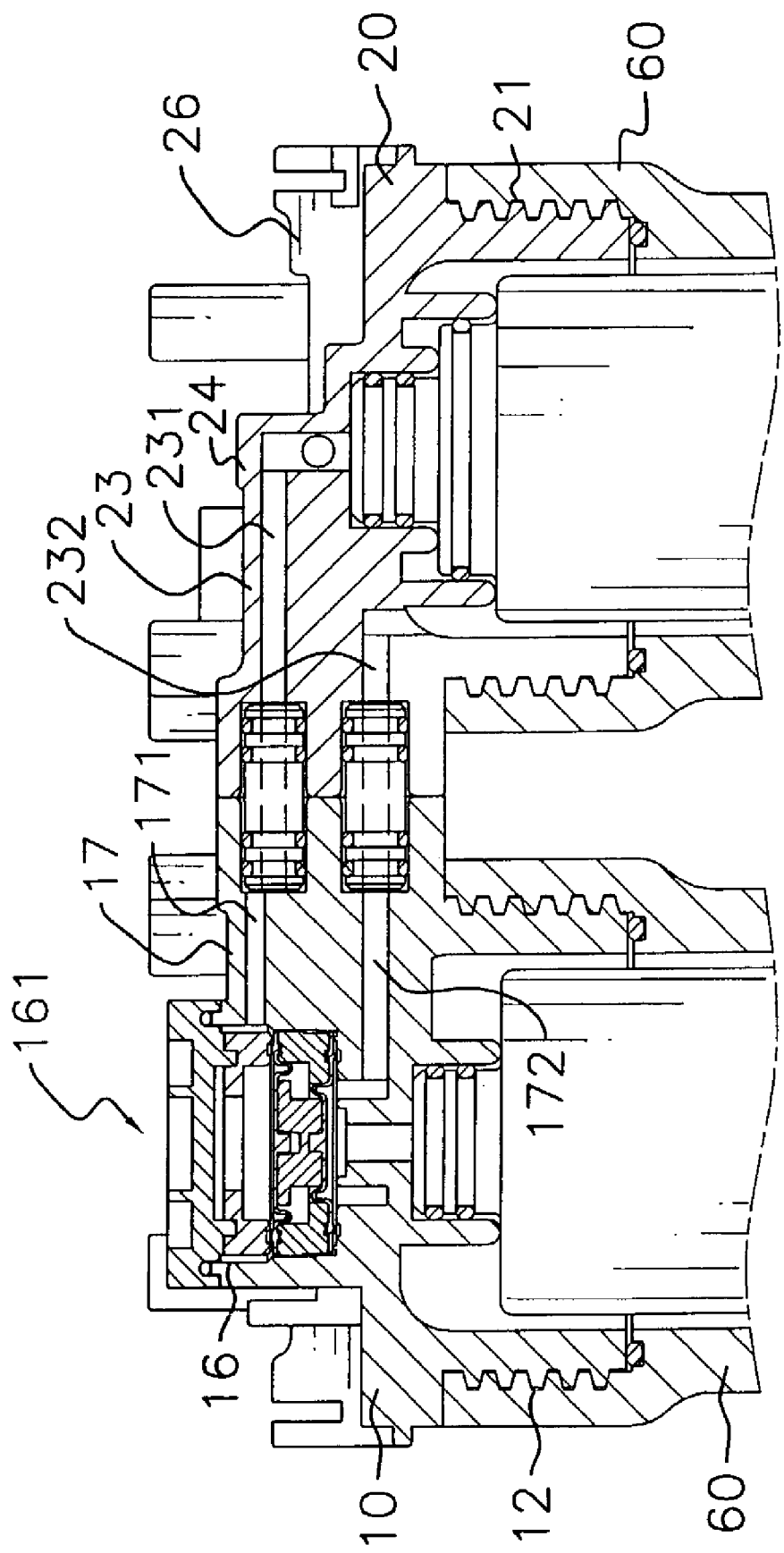
FIG. 8 is a cross sectional plan view of the pipe mounting apparatus along 8—8 line in FIG. 4.

With further reference to FIG. 8, the first connecting pipe (17) is formed adjacent to the switch recess (16) and has an upper channel (171) and a lower channel (172). The upper channel (171) communicates with the switch recess (16) at an upside position. The lower channel (172) communicates with the switch recess (16) through the bottom.

With reference to FIGS. 1 and 2, the first mounting assembly is formed on the top of the first half body (10) and comprises multiple first supporting posts (101), mounting recesses (102), a shut-off valve mounting recess (18) and a wire guide device (not numbered). The first supporting posts (101) protrude from the top of the first half body (10) and each of the first supporting posts (101) has a screw hole (not numbered). The mounting recesses (102) are defined at one side of the first half body (10) for mounting the second half board assembly. With further reference to FIG. 5, the shut-off valve mounting recess (18) is defined through the top of the first half body (10) and corresponds to the first housing mounting seat (11) to communicate with the inside of the first housing mounting seat (11). The wire guide device is formed on the top at one side of the first half body (10) opposite to the first connecting pipe (17) and comprises a guide seat (80) and an end plate (81). The guide seat (80) is formed on the top of the first body half (10). The end plate (81) is attached to the guide seat (80) such that the wire guide device will hold wires of a booster pump in position.

With reference to FIGS. 1, 2 and 4, the second half board assembly comprises a second half body (20), a second filter mounting device (not numbered), a second pipe assembly (not numbered) and a second mounting assembly (not numbered). The second half body (20) has a top (not numbered), a bottom (not numbered), a front (not numbered), a rear (not numbered) and two opposite sides (not numbered). The second filter mounting device is formed on the bottom of the second half body (20) and comprises a third housing mounting seat (21) with an inside (not numbered) and an exterior thread (not numbered), a third filter mounting seat (not numbered), a fourth housing mounting seat (22) with an inside (not numbered) and an exterior thread (not numbered) and a fourth filter mounting seat (not numbered). The third and the fourth housing mounting seats (21, 22) are adapted to mount with a respective one of the group of filter housings (60), respectively. The third filter mounting seat is formed inside the third housing mounting seat (21) and has an inside (not numbered) adapted to attach with a filtering core (not numbered). Likewise, the fourth filter mounting seat is formed inside the fourth housing mounting seat (22) and has an inside (not numbered) adapted to attach with a filtering core (not numbered).

The second pipe assembly is formed on the top of the second half body (20) and comprises a second connecting pipe (23), a second longitudinal pipe (24), a drain pipe (25), a tank pipe (26) and a water outlet pipe (27).

With further reference to FIG. 8, the second connecting pipe (23) is formed on the top of the second half body (20) and corresponds to the first connecting pipe (17) in the first pipe assembly. The second connecting pipe (23) has an upper channel (231) and a lower channel (232). The upper channel (231) communicates with the upper channel (171) of the first connecting pipe (17) and the inside of the third filter mounting seat. Likewise, the lower channel (232) communicates with the lower channel (172) in the first connecting pipe (17) and the inside of the third housing mounting seat (21).

Figure 9:
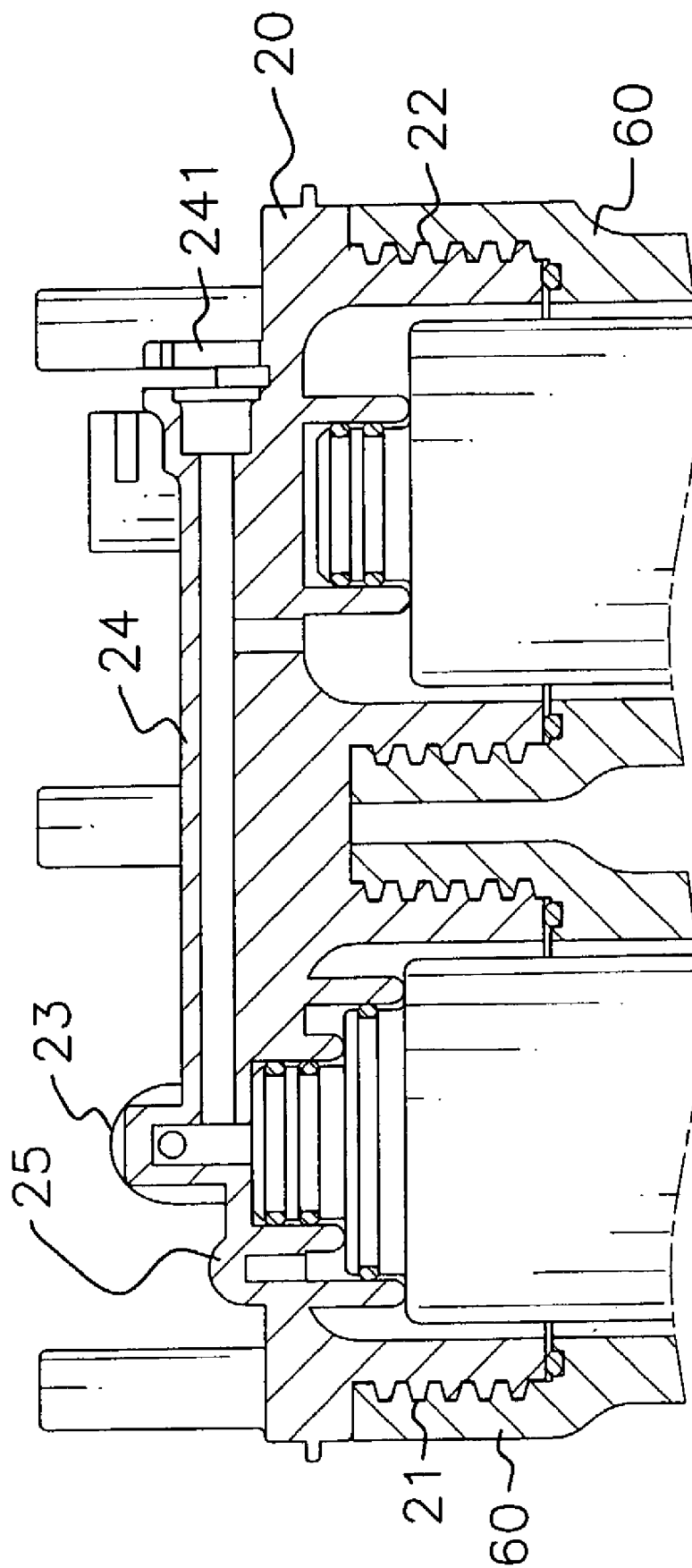
FIG. 9 is a cross sectional plan view of the pipe mounting apparatus along 9—9 line in FIG. 4.
Figure 10:
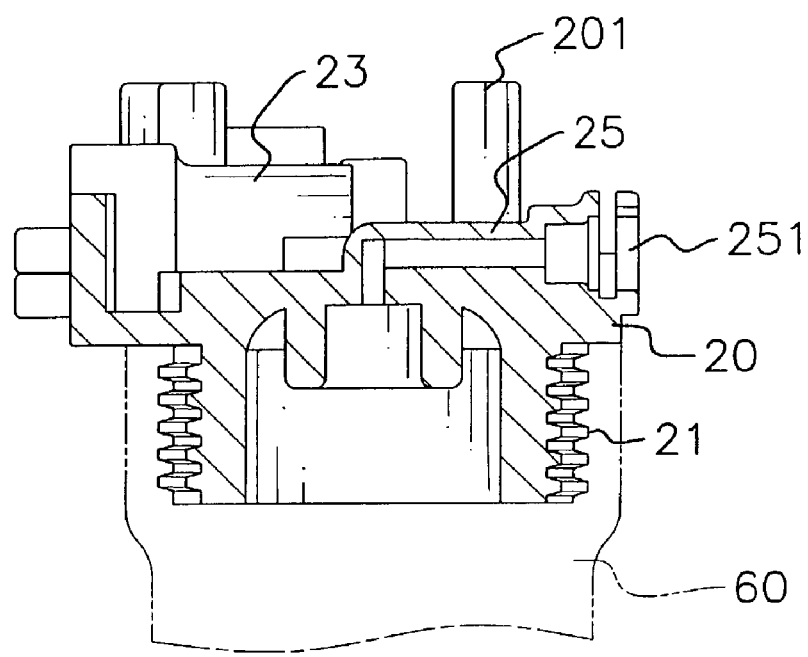
FIG. 10 is a cross sectional plan view of the pipe mounting apparatus along 10—10 line in FIG. 4.

With further reference to FIG. 9, the second longitudinal pipe (24) is formed on the top from the front to the rear of the second half body (10) and has a preformed outlet (241) and an inside opening (not numbered) that communicates with the inside of the third filter mounting seat. Also, the second longitudinal pipe (24) communicates with the inside of the fourth housing mounting seat (22). With reference to FIG. 10, the drain pipe (25) is formed on the top of the second half body (20) and has a drain outlet (251) and an inside opening (not numbered) that communicates with the inside of the third housing mounting seat (21).

With reference to FIGS. 1 and 4, the tank pipe (26) is formed on the top of the second half body (20) and has a tank outlet (261) and an inside opening (not numbered) that communicates with the second longitudinal pipe (24). The tank outlet (261) is adapted to be connected to a pressurized water tank (not shown) that will store the treated water under pressure.

Figure 11:
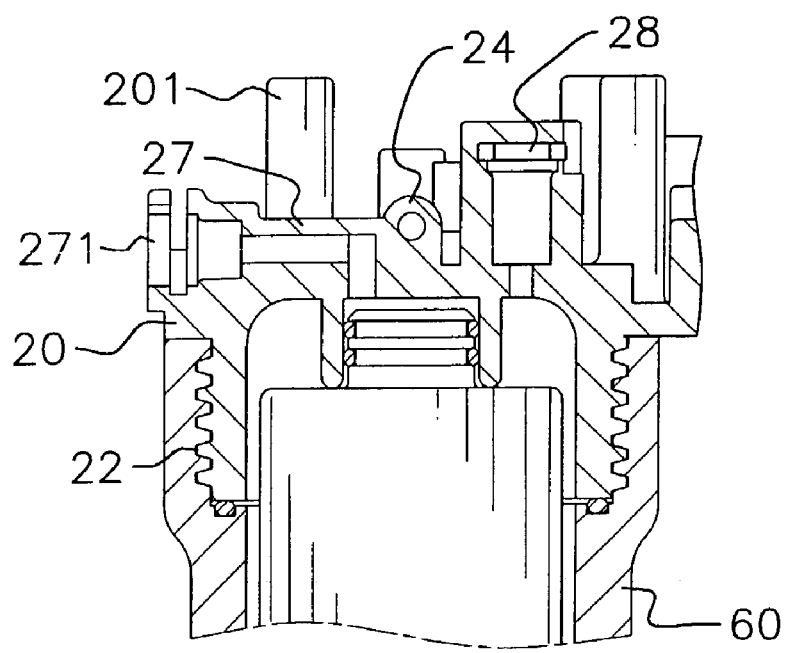
FIG. 11 is a cross sectional plan view of the pipe mounting apparatus along 11—11 line in FIG. 4.

With reference to FIGS. 4 and 11, the water outlet pipe (27) has a water outlet (271) and an inside opening (not numbered) that communicates with the inside of the fourth filter mounting seat. The water outlet (271) will be selectively connected to a faucet (not shown), a moving kit (not shown) or the like to let water out.

With reference to FIGS. 1, 2 and 4, the second mounting assembly comprises multiple second supporting posts (201), mounting ears (202) and a flood switch mounting recess (28). The second supporting posts (201) protrude from the top of the second half body (20). The mounting ears (202) are formed at one side of the second half body (20) and correspond to the mounting recesses (102) in the first half body (10). Each mounting ear (202) has a threaded hole (not numbered) and is held in a corresponding one of the mounting recesses (102). The mounting ears (202) and the mounting recesses (102) are fastened together by means of fasteners (not numbered), such as bolts or screws.

With further reference to FIG. 11, the flood switch mounting recess (28) is defined through the top of the second half body (20) and communicates with the inside of the fourth housing mounting seat (22).

If the pressure of the supply water is high enough, a booster pump is not needed for the water filter. The pump inlet (141), the pump outlet (151), the preformed outlet (241), the shut-off valve mounting recess (18) and the flood switch mounting recess (28) will be closed with use of the end plugs (70) respectively fitting in each of them. The end plugs (70) will be held in position by the resilient clamps (71). The water inlet (131), the drain outlet (251), the tank outlet (261) and the water outlet (271) will be respectively connected to connecting elbows (72) such that the inlets or outlets will conveniently connect to the supply lines, faucet, water tank or others, respectively.

Figure 3:
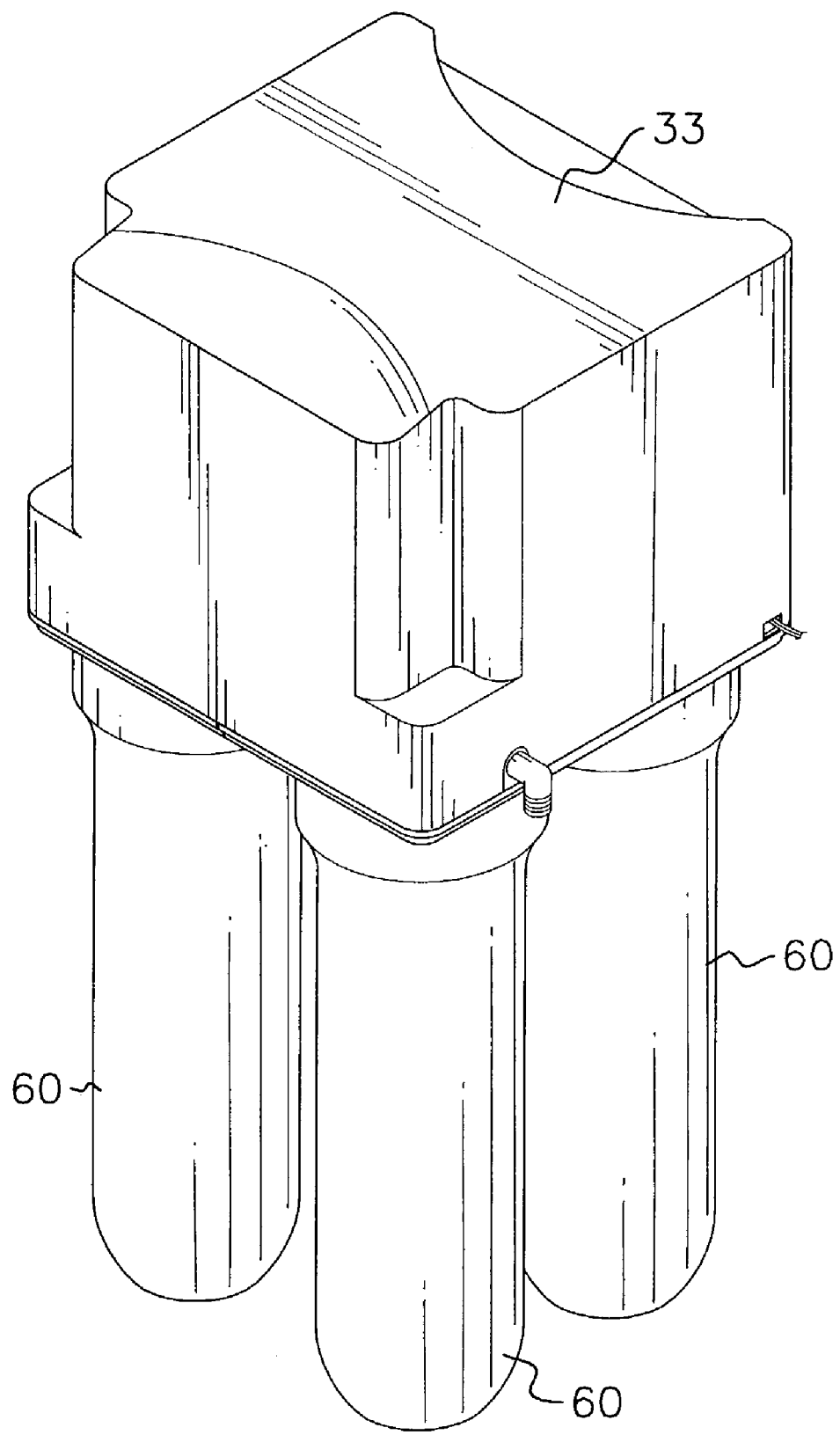
FIG. 3 is an operational perspective view of the water filter in FIG. 2.

With reference to FIGS. 2 and 3, the pipe mounting apparatus further comprises a mounting bracket (30) to support a booster pump assembly (not numbered). The booster pump assembly comprises a housing (33) and a booster pump (31) with a transformer (32). To control the booster pump (31), a shut-off valve (40) and a flood switch (50) that are electrically connected to the booster pump (31) will be needed. All of the end plugs (70) and the resilient clamps (71) except for the end plug (70) and the resilient clamp (71) in the preformed outlet (241) will be removed. The shut-off valve (40) and the flood switch (50) are respectively mounted in the shut-off valve mounting recess (18) and the flood switch mounting recess (28). The mounting bracket (30) is supported by the first and second support posts (101, 201) and has a top (not numbered) to bear the booster pump (31). Also, the mounting bracket (30) is fastened over the first and the second supporting posts (101, 201) with fasteners, such as bolts (not numbered). Operations and configurations of the booster pump (31), shut-off valve (40) and flood switch (50) are conventional, thus a detailed description is omitted.

The pump inlet (141) is connected to the booster pump (31) by means of connecting pipes (not shown). Also, the pump outlet (151) is connected to the booster pump (31) with a fitting (not shown) inserted into the outlet of the pump (151) to close the communication of the inside opening of the first longitudinal pipe (14) and the pump pipe (15). Therefore, when the supply water flows into the filter housing (60) mounted in the first housing mounting seat (11) for a first stage filtering treatment, the water will pass through the filtering core and flow out of this filter housing (60) through the pump inlet (141). The water will be drawn entering the booster pump (31) through the pump inlet (141). The booster pump (31) moves the water into the other filter housing (60) mounted on the second housing mounting seat (12) through the pump outlet (151) for a second stage water filtering treatment. The water will pass through the filtering core and enter the switch recess (16). The differential pressure switch (161) guides the water to enter another filer housing (60) mounted in the third housing mounting seat (21) through the lower channels (172, 232) for a third stage water filtering treatment. At this time, a portion of the water passes through the filtering core and returns to the switch recess (16) through the upper channels (231, 171). When the water pressure in the upper channels (171, 231) and the lower channels (172, 232) is equalized, the differential pressure switch (161) will close the flow of the water to stop the treatment of the water. The residual water, or called waste water will flow out through the drain outlet (251).

Also, the water will flow into a pressurized water tank (not shown) through the tank outlet (261) at the same time until the water pressure in the upper channels (171, 231) and the lower channels (172, 232) is equalized.

When the water outlet (271) is opened to let water flow out, the water will enter the filter housing (60) mounted on the fourth housing mounting seat (40), pass through the filter for a fourth stage water filtering treatment and finally flow out through the water outlet (271). Meanwhile, the water pressure in the upper channels (171, 231) will be diminished so the differential pressure switch (161) will allow the water flowing into the lower channels (172, 232) to undergo the third stage water filtering treatment as foregoing described.

The pipe mounting apparatus for the water filter system is convenient in use. All the user has to do is to remove the appropriate end plugs (70) and the resilient clamps (71), and connect the pump inlet (141) and the pump outlet (151) to the booster pump (31) with proper fittings and connecting pipes. The operation of setting the booster pump (31) is very easy and quick and so provides significant assistance to a DIY user.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A pipe mounting apparatus for a water filter, and the pipe mounting apparatus comprising:
    a first half board assembly comprising
        a first half body having a top, a bottom, a front, a rear and two opposite sides;
        a first filter mounting device formed on the bottom of the first half body and comprising
            a first housing mounting seat with an inside formed from the bottom of the first half body;
            a first filter mounting seat with an inside formed on the bottom of the first half body in the inside of the first housing mounting seat;
            a second housing mounting seat with an inside formed on the bottom of the first half body; and
            a second filter mounting seat with an inside formed on the bottom of the first half body in the inside of the second housing mounting seat;
        a first pipe assembly formed on the top of the first half body and comprising
            a water inlet pipe formed on the top of the first half body and having a supply water inlet and an inside opening communicating with the inside of the first housing mounting seat;
            a first longitudinal pipe formed from the front to the rear on the top of the first half body and having a pump inlet and an inside opening, the first longitudinal pipe communicating with the inside of the first filter mounting seat;
            a pump outlet pipe formed on the top of the first half body and having a pump outlet and an inside opening communicating with the inside of the second housing mounting seat, the pump outlet pipe communicating with the inside opening of the first longitudinal pipe;
            a switch recess with a bottom defined through the top of the first half body and communicating with the inside of the second filter mounting seat; and
            a first connecting pipe formed adjacent to the switch recess and having an upper channel and a lower channel, the upper channel communicating with the switch recess at an upside position and the lower channel communicating with the switch recess through the bottom;
        a differential pressure switch mounted in the switch recess; and
        a first mounting assembly formed on the top of the first half body; and
    a second half board assembly coupled to the first half board assembly and comprising
        a second half body attached to the first half body and having a top, a bottom, a front, a rear and two opposite sides;
        a second filter mounting device formed on the bottom of the second half body and comprising a third housing mounting seat with an inside formed on the bottom of the second half body;

a third filter mounting seat formed with an inside on the bottom of the second half body in the inside of the third mounting seat;

a fourth housing mounting seat with an inside formed on the bottom of the second half body; and a fourth filter mounting seat with an inside formed on the bottom of the second half body in the inside of the fourth housing mounting seat;

a second pipe assembly formed on the top of the second half body and comprising a second connecting pipe formed on the top of the second half body and communicating with the first connecting pipe in the first pipe assembly, the second connecting pipe having an upper channel and a lower channel, where the upper channel in the second connecting pipe communicates with the upper channel in the first connecting pipe and the inside of the third filter mounting seat, and the lower channel in the second connecting pipe communicates with the lower channel in the first connecting pipe and the inside of the third housing mounting seat;

a second longitudinal pipe formed on the top from the front to the rear of the second half body and having a preformed outlet and an inside opening communicating with the inside of the third filter mounting seat, the second longitudinal pipe communicating with the inside of the fourth housing mounting seat;

a drain pipe formed on the top of the second half body and having a drain outlet and an inside opening communicating with the inside of the third housing mounting seat;

a tank pipe formed on the top of the second half body and having a tank outlet and an inside opening communicating with second longitudinal pipe; and a water outlet pipe formed on the top of the second half body and having a water outlet and an inside opening communicating with the inside of the fourth filter mounting seat; and a second mounting assembly formed on the top of the second half body.

2. The pipe mounting apparatus as claimed in claim 1 further comprising a shut-off valve mounting recess defined through the top of the first half body corresponding to the first housing mounting seat and communicating with the inside of the first housing mounting seat;

a flood switch mounting recess defined through the top of the second half body and communicating with the inside of the fourth housing mounting seat; and a wire guide device formed on the top at one side of the first half body opposite to the connecting pipe and comprising a guide seat and an end plate, the guide seat formed on the top of the first half body and the end plate attached to the guide seat.

3. The pipe mounting apparatus as claimed in claim 2, wherein the first mounting assembly comprises multiple first supporting posts protruded from the top of the first half body and each of the first supporting posts has a screw hole;

the second mounting assembly comprises multiple second supporting posts protrudes from the top of the second half body, and each of the second supporting posts has a screw hole; and a mounting bracket supported by the first and the second supporting posts and has a top adapted for bearing a booster pump.

4. The pipe mounting apparatus as claimed in claim 3, wherein the first mounting assembly further has multiple mounting recesses defined at one side of the first half body for mounting the second half body; and the second mounting assembly further has multiple mounting ears formed at one side of the second half body corresponding to the mounting recesses in the first half body and each mounting ear has a threaded hole and is held in a corresponding one of the mounting recesses to be fastened by means of a fastener.

5. The pipe mounting apparatus as claimed in claim 4, wherein each of the first, second, third and fourth housing mounting seats further has an exterior thread for mounting a filter housing.

6. The pipe mounting apparatus as claimed in claim 1, wherein the first mounting assembly has multiple mounting recesses defined at one side of the first half body for mounting the second half body; and the second mounting assembly has multiple mounting ears formed at one side of the second half body corresponding to the mounting recesses in the first half body and each mounting ear has a threaded hole and is held in a corresponding one of the mounting recesses to be fastened by means of a fastener.

7. The pipe mounting apparatus as claimed in claim 6, wherein each of the first, second, third and fourth housing mounting seats further has an exterior thread for mounting a filter housing.

* * * * *